May 1, 1945.   L. R. BARGHAUSEN   2,374,723
IDENTIFICATION MEANS FOR DOCUMENTS
Filed May 4, 1944   2 Sheets-Sheet 2
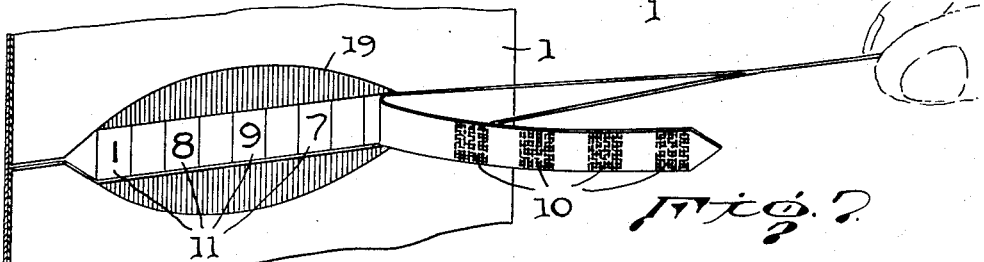

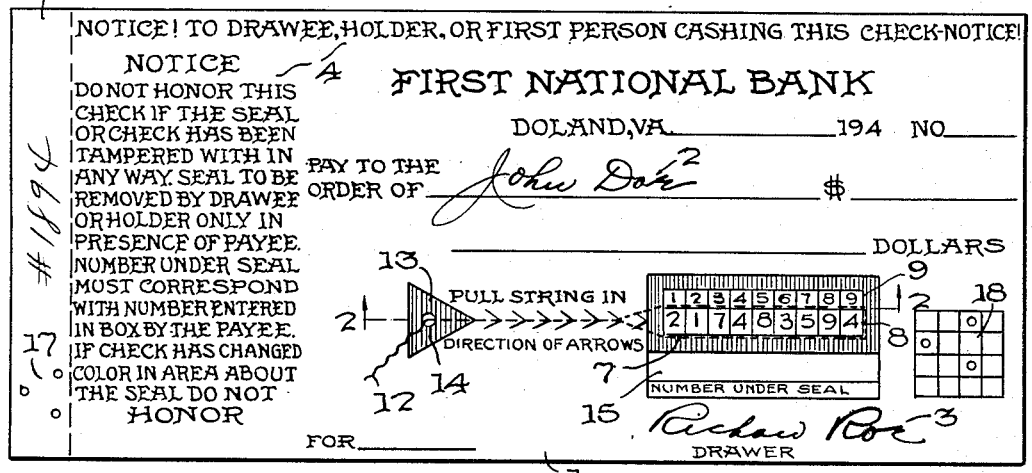

Patented May 1, 1945

2,374,723

UNITED STATES PATENT OFFICE 2,374,723

IDENTIFICATION MEANS FOR DOCUMENTS

Lawrence R. Barghausen, Alexandria, Va.

Application May 4, 1944, Serial No. 534,146

3 Claims. (Cl. 282—22)

This invention pertains to improvements in identification devices, and more especially to such devices as may be applied to negotiable instruments, such as checks, drafts, and the like, passports, claim checks, and other documents of a more or less personal nature, whereby to prevent their fraudulent use or acceptance, without proper authorization or satisfactory identification of the claimant.

At the present time, many thousands of dollars are fraudulently obtained yearly by unauthorized persons through the cashing of checks, particularly those issued by the Government of the United States, and other organizations having large numbers of employees.

In the majority of cases, these losses could have been prevented through the exercise of greater care and attention to the identification of the person presenting the check to be cashed or in payment for goods, wares and merchandise for which the check is tendered after false, forged or other improper or misrepresented endorsement. Unfortunately, however, no satisfactory practical means has heretofore been devised which would prevent such frauds.

It is accordingly the primary object of the present invention to provide a simple, practical and effective fraud prevention or identification device which may be conveniently applied to various uses, more especially to checks, passports, and the like, the essential feature of which resides in the provision of a secret identification such as a number or other indicia, the same being normally hidden until such time as it becomes desirable to establish the identification of the person presenting the check or passport, as the case may be.

A further object of my invention is to provide a novel arrangement of the secret identification device in its association with and make-up of the check, passport, or other document of which it forms a part, together with a convenient means for exposing the secret identification when the occasion so requires, all without the aid of any special equipment, such as invisible inks, acids, and other liquids such as have heretofore been proposed but found to be impractical.

In carrying out the principles of my invention, a choice of at least two practices may be followed, namely, the secret identification can be embodied in the check or passport in the original manufacture thereof, or the secret identification can be set up or applied at the time of issue or use of the check or passport, the latter being a more flexible system and hence more satisfactory for certain uses.

The invention is still further characterized by the construction of the protected document in a laminated form in which there are at least two sheets or layers bonded together in superposed relation, one of the layers carrying on its inner face a secret number or other indicia which is normally concealed until such time as it is desired to compare the same with the corresponding identification presented by the person to be identified, in addition to which the document has incorporated therein a convenient seal-removing element which is accessible on one face of the document to permit the removal of a seal or other concealing means for the purpose of exposing the secret identification indicia when the occasion so requires.

Other and further objects and advantages of the invention will be hereinafter described, and the novel features thereof defined by the appended claims.

In the drawings:

Figure 1 is a face view of a check or equivalent negotiable instrument made in accordance with one form of my invention, in which the secret identification may be set up or applied at the time of use or issue of the check;

Figure 2 is a sectional view, on an enlarged scale, taken through the identification device on the line 2—2 of Figure 1;

Figure 3 is a sectional view taken on the line 3—3 of Figure 2;

Figure 4 is a fragmentary front face view of the backing sheet or rear layer of the check to which the ripping element or seal-breaking string has been applied preliminary to assembly with the front layer or face of the check;

Figure 5 is an enlarged, fragmentary perspective view illustrating the manner of use of the identification device, the seal having been broken by exerting a pull on the ripping element, thereby exposing the secret indicia;

Figure 6 is a face view of a somewhat modified form of check, utilizing a secret identification means which is generally similar to that shown in Figures 1 to 5;

Figure 7 is a fragmentary perspective view, illustrating the manner of exposing the secret identification number of the check of Figure 6, and corresponding generally to Figure 5;

Figure 8 is a face view of another modified form of check in which the secret indicia is applied to the backing sheet before assembly with the front face or layer of the check, so that the check is immediately ready for use without further attention to the application of the secret indicia; and Figure 9 is a fragmentary detail view showing the check of Figure 8 after removal of the seal to disclose the secret indicia which is carried by the front face of the backing sheet.

Like reference characters designate corresponding parts in the several figures of the drawings. Referring first to Figures 1 to 5 inclusive, 1 generally denotes a document, such as a negotiable check or draft, and having imprinted on its front face the usual data and spaces to be filled in by the drawer. As illustrated in Figure 1, the name of the payee, John Doe, is filled in at 2, and the check is signed in the usual manner by the drawer, Richard Roe, as inicated at 3. Where desired, the check may carry at its margin or elsewhere thereon a suitable notice by way of warning or explanation of the use of the check, as indicated at 4.

As will be best understood by reference to Figures 2 and 3, the check has the form of a laminated sheet or body which includes at least two layers, that is, a backing sheet or layer 5 and a front face sheet or layer 6. The laminations or layers are suitably bonded together in the course of manufacture of the checks, so that each check will have a unitary form generally corresponding to a conventional check or similar document, excepting for its laminated form. At some suitable point, preferably on the face thereof, the check is provided with a removable seal, generally designated 7, which is normally an integral part of the face sheet of the laminated body. The seal, as shown in Figure 1, comprises the area bounded by the broken lines around the lower row of numbers indicated at 8, and this area is preferably subdivided into a series of individual digit places or boxes, above which is arranged a second row of numbers 9 respectively identifying the digit places or boxes 8 in numerical order.

Positioned between the seal 7 and the backing sheet 5, suitable means is provided for transferring to the backing sheet any indicia which may be applied to the front face of the seal 7 according to some preselected arrangement, so that the indicia so transferred to the backing sheet will constitute a secret identification which is normally concealed by the seal 7. According to the arrangement illustrated in the drawings, the transfer is accomplished by the utilization of a transfer coating, such as carbon, as indicated at 10 in Figure 5. The areas of the seal so provided with the transfer medium are those areas identified by the numbers 2, 5, 8 and 9 in the row of numbers designated 9 above the digit boxes 8 of the seal 7. To apply the secret indicia to the check, it is simply necessary to write a series of numbers, as by means of a typewriter or other impression device, in the digit boxes 8, so that the desired identification indicia will be inscribed in those particular boxes which are provided on their rear faces with the transfer medium 10. In the particular arrangement shown in the drawings, having regard for Figures 1 and 5, the identification indicia will be transferred to the backing sheet 5 only at those digit boxes designated 2, 5, 8 and 9, and the identification indicia itself will be the number "1894," which is composed of the individual digits applied to the respective digit boxes. The other numbers appearing in the other digit boxes of the row 8 are simply "blinds," which are so mingled with the true identification numbers as to make it impossible to determine from the face of the check by ordinary inspection just which digit or digits of the row 8 constitute the true identification indicia. While four digits have been utilized as the identification indicia in the illustrations shown in the drawings, it will be understood that this can be varied as desired. In practice, the digit boxes utilized for the true identification indicia may be changed from time to time, according to the preselection of the transfer medium 10 which is applied to one or more of the digit boxes in any suitable order or arrangement.

It will be understood from the foregoing that the identification indicia appearing on the inner face of the backing sheet 5, as indicated at 11, is normally concealed by the seal 7, and until the seal is removed, it is impossible to determine what appears beneath the same. Any suitable means may be provided for facilitating the removal of the seal, when the occasion so requires. As shown, by way of illustration, the seal removing means preferably has the form of a ripping element, generally designated 12, the same being incorporated in the check and disposed for convenient access thereto. The ripping element 12 comprises a string, thread, or other filament, which is disposed between the two layers 5 and 6 respectively of the composite check body 1, and at one end thereof, the thread splits, as indicated at 12', 12', so that it outlines the seal 7 at the back thereof. This arrangement of the thread may be obtained by doubling the thread and applying the same to the backing sheet 5 in the form illustrated in Figure 4, the free ends of the thread being laid together in side-by-side relation and extended to a point remote from the seal, where the thread is brought through the front layer 6 so that it is accessible from the front face of the check. To prevent the thread from inadvertently tearing or ripping the check, an apertured reinforcing seal 13 is adhesively or otherwise applied to the face of the check, with the aperture 14 thereof registering with the point at which the thread 12 is brought through the face of the check, so that the thread extends forwardly through the aperture 14. By distinctively coloring or otherwise marking the reinforcing seal 13, the free end of the thread 12 may be conveniently located. To remove the seal 7, it is simply necessary to grasp the thread 12 between the fingers, as indicated in Figure 5, and exert a pull thereon, which will rip the front face 6 of the composite check body 1 in the manner shown, causing the seal 7 to be severed around its margin, thereby exposing the identifying indicia 11 carried by the inner face of the backing sheet 5. The seal may thereafter be torn off and discarded, if desired.

In the use of the check, and assuming the same has been drawn by Richard Roe as the drawer, as indicated by the signature 3, and made payable to John Doe, the payee indicated at 2, the check may be presented by the payee, either to the bank as the drawee or to a holder other than the bank, either of whom should require satisfactory identification of the payee before honoring the check. At the time of issuance of the check, the payee is advised as to his identification number, either by an appropriate notice or otherwise by the assignment of a suitable identification number which may be set up for all checks drawn in favor of the particular payee, John Doe. Accordingly, in presenting the check for cash or in payment for goods, wares and merchandise, the drawee or holder will demand identification of the payee, whereupon, in the presence of the drawee or holder, the payee will make known his identification number, as by inserting the number in the space 15 provided on the check body 1 at some convenient point, before the seal 7 is broken. Thereafter, the drawee or holder will break the seal by pulling the string 12 so that the seal 7 is removed to expose the secret number, as indicated at 11, on the inner face of the backing sheet 5. This secret number must correspond with the number previously entered by the payee in the space 15, in which event the identification of the payee will be considered satisfactory.

It will be understood from the foregoing that checks embodying the secret identification device may be employed in the conventional manner of negotiable instruments, both before and after breaking of the seal 7, the secret identification device being primarily intended for use in the prevention of the practice of fraud upon the drawee or other first person cashing or honoring the check.

The check may be provided with a removable stub 16 in the usual manner, which may be utilized either as a permanent record of the drawer, or as a notice to the payee advising the latter as to his secret identification number. This stub and/or the check itself may be perforated, as indicated at 17, 18, according to the conventional practices frequently employed in the automatic classification and tabulation of checks and similar documents.

Referring to Figures 6 and 7, the arrangement of the check and the secret identification device is substantially the same as previously described with reference to Figures 1 to 5 inclusive. Accordingly, the equivalent elements are identified by the same reference characters, in addition to which, it will be noted that the area on the face of the check around the seal 7 is distinctively colored or otherwise marked, as indicated at 19, to more readily aid the user in locating the identification device, or otherwise to prevent tampering with the identification device. In any of the various forms of the invention, should it appear that the identification device has been tampered with, or the seal broken, before it is presented by the payee, the check should not be honored.

According to the illustration in Figures 6 and 7, the secret indicia which is normally concealed by the seal 7 is the number "1897." The digits of this number appear on the inner face of the backing sheet 5 in register with the digit boxes numbered 1, 3, 5 and 7 respectively on the seal 7. Only the digits written in these boxes in the row 8 will be transferred to the backing sheet 5 by the transfer medium 10 which is applied to the inner face of the seal 7. All other numbers written on the seal are "blinds," and will not appear on the backing sheet when the seal 7 is removed.

In both forms of the invention hereinbefore described, the secret identification indicia is preferably applied to preselected digit boxes on the seal 7 at the time of issuance of the check. A simplified embodiment of this idea will now be described, and particular reference is made to Figures 8 and 9, wherein the check has the same form of a composite body 20 composed of at least a front sheet 21 and a backing sheet 22 permanently united together in the manufacture thereof. In this instance, the backing sheet 22 is initially imprinted on its inner face with the secret identification indicia 23, before the backing sheet is united with the face sheet 21. The removable seal 24, which is normally an integral part of the face sheet 21, and corresponds to the seal 7 previously described, normally conceals the secret indicia 23. When identification of the payee is required, and after entry by the payee of his secret number in the space 25, the seal 24 may be removed by pulling the string 26, whereupon the secret number "1894" will be exposed for comparison with the number entered by the payee in the space 25.

In lieu of the transfer means designated 10 in Figures 1 to 7 of the drawings, other provisions may be made for applying the secret indicia to the backing sheet after assembly of the laminated composite body of the document. Accordingly, it is within the purview of my invention to sensitize, coat, impregnate, or otherwise treat the backing sheet or a predetermined area thereof with a substance which is reactive to heat, light, X-rays, or other magnetic or electrical energy or the like. On preparation of the document for use or issue to a particular person, the document may be subjected to heat, light, X-rays, magnetic or other electrical energy or the like, as the case may be, applying the same externally to the document so as to change the characteristic of the reactive substance in a predetermined area of the backing sheet without affecting the seal or front face of the document in any way, and which change in characteristic aforesaid only becomes apparent upon removal of the seal which normally conceals the area of the backing sheet to which the reactive substance has been applied. The change in characteristic of the reactive substance will preferably assume the form of visible indicia or other readily ascertainable condition which can be made known to the person to be identified as a means of comparison with the secret identification under the seal, when the seal is broken.

Other various applications and adaptations of my system of identification will be readily understood from the foregoing, and while the description of my invention has been primarily confined to its application to checks and similar negotiable instruments, it is to be understood that this is not intended as a limitation upon the use of the invention, since other changes and alterations may be made without departing from the spirit thereof as defined by the appended claims.

I claim:

1. A document of the class described, comprising a composite body of laminated form, the laminations of which are bonded together into a unitary structure, the inner face of one of the laminations having a surface for the reception of secret identification indicia, said surface being normally covered by the overlying adjacent lamination, the latter lamination having a displaceable area forming a removable seal normally covering the identification receiving surface of the first-mentioned lamination to normally conceal the latter, the outer face of the removable seal being divided into a series of appropriately designated subordinate indicia-receiving areas, and means for applying to the secret identification receiving surface aforesaid the secret identification indicia only, when such indicia is applied to selected subordinate areas on the outer face of the seal, amongst other indicia applied to the other subordinate areas.

2. An article of the class described, comprising a composite body of laminated form, the laminations of which are bonded together into a unitary structure, one of the laminations having a surface for the reception of secret identification indicia, said surface being normally covered by the overlying adjacent lamination, the latter lamination having a displaceable area forming a removable seal normally covering the identification receiving surface of the first-mentioned lamination to normally conceal the latter, the outer face of the removable seal being divided into a series of appropriately designated subordinate areas, the inner face of certain selected ones of the subordinate areas being provided with transfer means to reproduce the secret indicia upon the concealed indicia receiving surface upon applying such indicia to at least those certain selected subordinate areas on the outer face of the seal, and means carried by the composite body for removing the seal to expose the indicia receiving surface aforesaid.

3. An article of the class described, comprising a composite body of laminated form, the laminations of which are bonded together into a unitary structure, one of the laminations having a surface for the reception of secret identification indicia, said surface being normally covered by the overlying adjacent lamination, the latter lamination having a displaceable area forming a removable seal normally covering the identification receiving surface of the first-mentioned lamination to normally conceal the latter, the outer face of the removable seal being divided into a series of appropriately designated subordinate areas, the inner face of certain selected ones of the subordinate areas being carbonized to reproduce the secret indicia upon the concealed indicia receiving surface upon applying such indicia to at least those certain selected subordinate areas on the outer face of the seal, and means carried by the composite body for removing the seal to expose the indicia receiving surface aforesaid.

LAWRENCE R. BARGHAUSEN.